United States Patent
Kim et al.

(10) Patent No.: US 10,728,958 B2
(45) Date of Patent: Jul. 28, 2020

(54) HEATING ELEMENT STRUCTURE, METHOD OF FORMING THE SAME, AND HEATING DEVICE INCLUDING THE HEATING ELEMENT STRUCTURE

(71) Applicant: Samsung Electronics Co., Ltd., Suwon-si, Gyeonggi-do (KR)

(72) Inventors: Seyun Kim, Seoul (KR); Jinhong Kim, Seoul (KR); Haengdeog Koh, Hwaseong-si (KR); Doyoon Kim, Hwaseong-si (KR); Hajin Kim, Hwaseong-si (KR); Soichiro Mizusaki, Suwon-si (KR); Minjong Bae, Yongin-si (KR); Changsoo Lee, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 380 days.

(21) Appl. No.: 15/868,451

(22) Filed: Jan. 11, 2018

(65) Prior Publication Data
US 2019/0037645 A1    Jan. 31, 2019

(30) Foreign Application Priority Data

Jul. 31, 2017    (KR) .................. 10-2017-0097129

(51) Int. Cl.
*H05B 3/14*    (2006.01)
*H05B 3/26*    (2006.01)
(Continued)

(52) U.S. Cl.
CPC ............. *H05B 3/141* (2013.01); *C03C 3/064* (2013.01); *C03C 4/16* (2013.01); *H01C 17/06* (2013.01); *H01C 17/30* (2013.01); *H05B 3/262* (2013.01)

(58) Field of Classification Search
CPC ........ H05B 3/141; H05B 3/262; C03C 3/064; C03C 4/16; H01C 17/06; H01C 17/30
(Continued)

(56) References Cited

U.S. PATENT DOCUMENTS 4,177,376 A * 12/1979 Horsma ................. H01C 7/027
219/553
4,330,703 A * 5/1982 Horsma ................. B29C 65/342
174/DIG. 8
(Continued)

FOREIGN PATENT DOCUMENTS

CN    202587422 U    12/2012
KR    101064698 B1    9/2011
(Continued)

OTHER PUBLICATIONS

EESR issued by the European Patent Office on Nov. 14, 2018 in the examination of European Patent Application No. 18166176.0, which corresponds to above U.S. Appl. No. 15/868,451.
(Continued)

*Primary Examiner* — Benjamin R Shaw
(74) *Attorney, Agent, or Firm* — Cantor Colburn LLP

(57) ABSTRACT

A The heating element structure includes: a conductive metal substrate; a heating layer spaced apart from the conductive metal substrate and configured to generate heat in response to an electrical signal; electrodes in contact with the heating layer and configured to provide the electrical signal to the heating layer; and a first insulating layer on the conductive metal substrate, the first insulating layer comprising a first matrix material and a particle, wherein a difference between a coefficient of thermal expansion (CTE) of the first matrix material and a coefficient of thermal expansion of the particle is about $4 \times 10^{-6}$ per Kelvin or less.

29 Claims, 9 Drawing Sheets

(51) Int. Cl.
*C03C 4/16* (2006.01)
*H01C 17/30* (2006.01)
*C03C 3/064* (2006.01)
*H01C 17/06* (2006.01)

(58) Field of Classification Search
USPC .......................................................... 219/553
See application file for complete search history.

(56) References Cited

U.S. PATENT DOCUMENTS

| | | | |
|---|---|---|---|
| 4,543,474 A * | 9/1985 | Horsma | ............... H01C 1/1406 |
| | | | 219/505 |
| 6,222,166 B1 | 4/2001 | Lin et al. | |
| 2003/0063931 A1 * | 4/2003 | Sanpei | ............... G03G 15/2053 |
| | | | 399/328 |
| 2005/0137074 A1 | 6/2005 | Crosbie | |
| 2009/0114639 A1 | 5/2009 | Werkman et al. | |
| 2009/0272731 A1 * | 11/2009 | Olding | .................... C08L 81/02 |
| | | | 219/482 |
| 2011/0188838 A1 * | 8/2011 | Abbott | .................... F27D 11/12 |
| | | | 392/407 |
| 2012/0171420 A1 | 7/2012 | Molins et al. | |
| 2012/0247641 A1 * | 10/2012 | Ruggiero | ................. H05B 3/26 |
| | | | 156/60 |
| 2017/0171916 A1 | 6/2017 | Kim et al. | |
| 2018/0136181 A1 * | 5/2018 | Bae | ........................ H01B 3/087 |
| 2019/0037644 A1 * | 1/2019 | Kim | ....................... H05B 3/262 |

FOREIGN PATENT DOCUMENTS

| | | |
|---|---|---|
| KR | 1020120083339 A | 7/2012 |
| KR | 1020190013482 A | 2/2019 |
| WO | 2009129615 A1 | 10/2009 |

OTHER PUBLICATIONS

Zenjebil Jouini, et al., "Effect of Mechanical Prestress on the Dielectric Strength of Alumina", 2016 IEEE International Conference on Dielectrics (ICD), 4 pp.

* cited by examiner

C

HEATING ELEMENT STRUCTURE, METHOD OF FORMING THE SAME, AND HEATING DEVICE INCLUDING THE HEATING ELEMENT STRUCTURE

CROSS-REFERENCE TO RELATED APPLICATION

This application claims priority to and the benefit of Korean Patent Application No. 10-2017-0097129, filed on Jul. 31, 2017, in the Korean Intellectual Property Office, and all the benefits accruing therefrom under 35 U.S.C. § 119, the content of which in its entirety is incorporated herein by reference.

BACKGROUND

1. Field

The present disclosure relates to a heating element structure, a method of forming the same, and a heating device including the same.

2. Description of the Related Art

A heating element may include organic heating elements such as graphite, carbon nanotubes, or carbon black, metallic heating elements consisting of a metal such as silver, nickel-chromium, molybdenum, or tungsten, and ceramic heating elements consisting of a ceramic material, such as silicon carbide, molybdenum silicide, or the like. In accordance with its shape, a heating element may be classified into a bar-shaped heating element, a planar heating element such as those mounted in a thick film form on a substrate, or the like.

In a planar heating element, when a support of the planar heating element is a metal, an insulating layer may be disposed between the support and the heating element. However, it would be desirable to provide insulating layers having improved insulating characteristics.

SUMMARY

Provided is a heating element structure having improved insulating characteristics.

Provided is a method of forming the heating element structure.

Provided is a heating device having improved performance by using the heating element structure.

According to an aspect of an embodiment, a heating element structure includes: a conductive metal substrate; a heating layer spaced apart from the conductive metal substrate and configured to generate heat in response to an electrical signal; electrodes in contact with the heating layer and configured to provide the electrical signal to the heating layer; and a first insulating layer on the conductive metal substrate, the first insulating layer including a first matrix material and a particle, wherein a difference between a coefficient of thermal expansion (CTE) of the first matrix material and a coefficient of thermal expansion of the particle is about $4 \times 10^{-6}$ per Kelvin or less.

According to an aspect of another embodiment, a method of forming the above-described heating element structure includes: providing a composition including a matrix material and a particle; applying the composition on a surface of the conductive metal substrate; thermally treating the composition on the surface of the conductive metal substrate to form the insulting layer; and disposing the electrodes and the heating layer on the insulating layer.

According to an aspect of another embodiment, a heating device includes the above-described heating element structure.

Additional aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
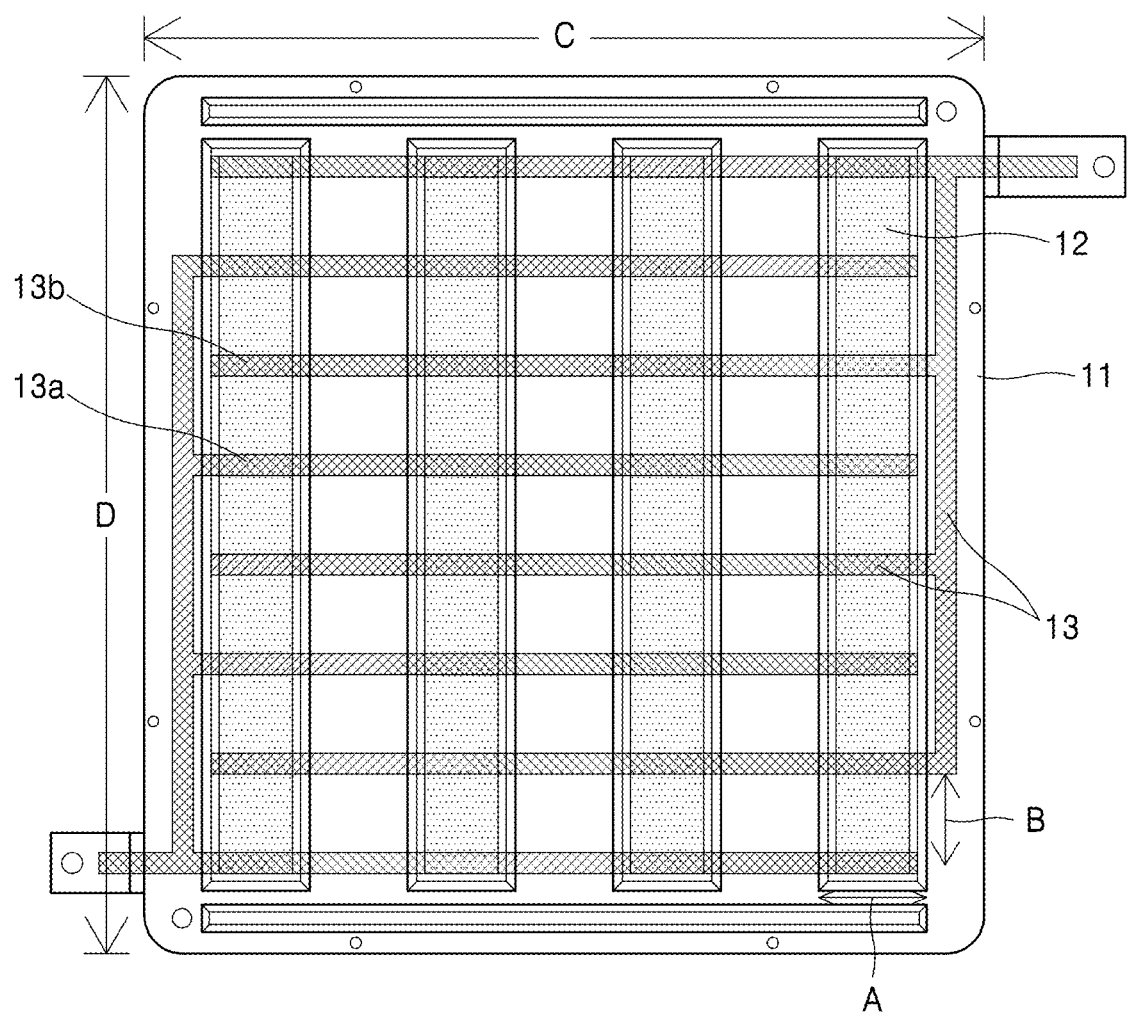
FIG. 1A is a top view of a heating element structure according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, "a first element," "component," "region," "layer," or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of a heating element structure, a method of forming the heating element structure, and a heating device including the heating element structure, will be described in greater detail.

According to an aspect of the inventive concept, a heating element structure includes a conductive metal substrate; a heating layer spaced apart from the conductive metal substrate and configured to generate heat in response to an electrical signal; electrodes in contact with the heating layer and configured to provide the electrical signal to the heating layer; and an insulating layer on the conductive metal substrate, the insulating layer comprising a matrix material and a particle, wherein a difference between a coefficient of thermal expansion (CTE) of the matrix material and a coefficient of thermal expansion of the particle is about $4 \times 10^{-6}$ per Kelvin ($K^{-1}$) or less.

In the heating element structure, the insulating layer may be between the conductive metal substrate and the heating layer to prevent generation of a leakage current in between the conductive metal substrate and the heating layer. The heating layer may generate heat as electricity is applied thereto.

When a difference in the CTE between the matrix material and the particle in the insulating layer exceeds $4 \times 10^{-6}$ $K^{-1}$, internal stress of the insulating layer may be increased causing defects such as microcracks. Accordingly, the insulating characteristics of the insulating layer may deteriorate since electricity may flow through such defects.

Figure 1B:
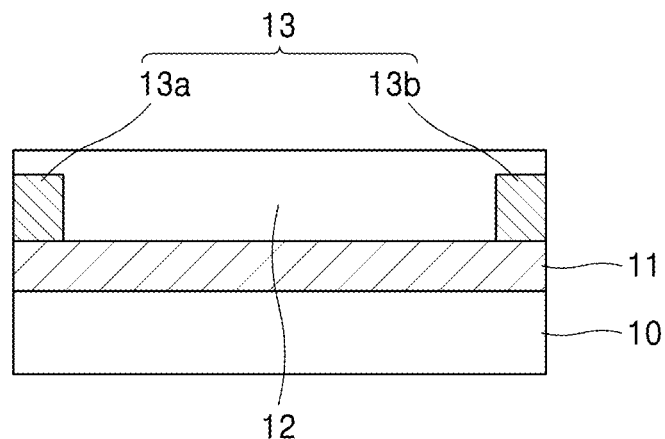
FIGS. 1B and 1C are schematic cross-sectional views of the heating element structure of FIG. 1A, according to embodiments.
Figure 1C:
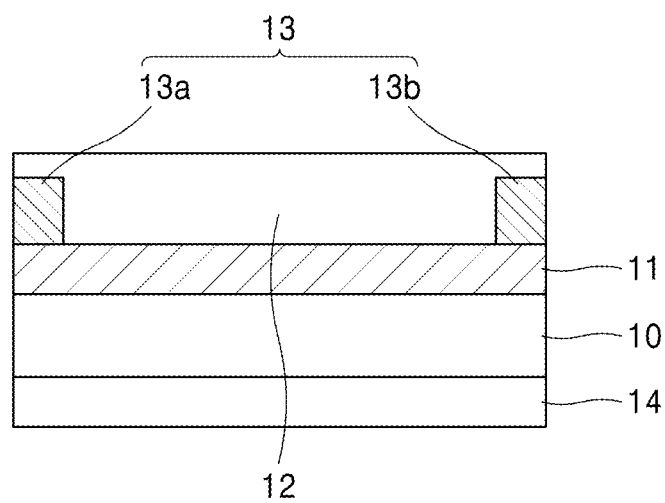
Figure 1D:
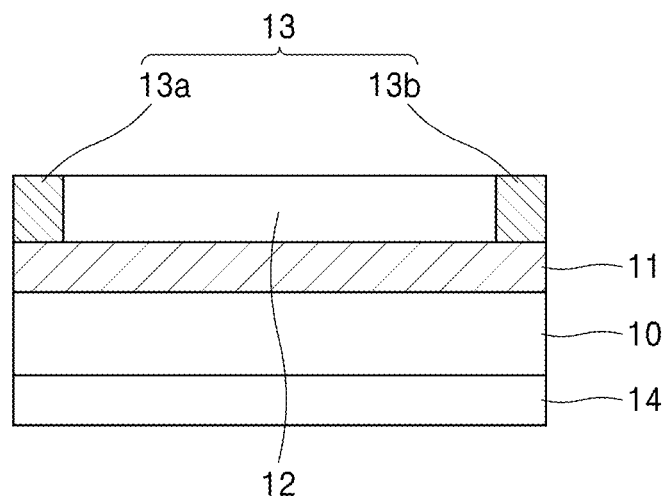
FIG. 1D is a schematic cross-sectional view of a heating element structure, according to an embodiment.

FIG. 1A is a top view illustrating a heating element structure according to an embodiment. FIGS. 1B and 1C are schematic cross-sectional views of the heating element structure according to embodiments.

Referring to FIGS. 1A to 1C, a heating element structure according to an embodiment may include a first insulating layer 11 between a conductive metal substrate 10 and a heating layer 12. As illustrated in FIG. 1C, the heating element structure may further include a second insulating layer 14 under the conductive metal substrate 10. The second insulating layer 14 may protect the conductive metal substrate 10 from being oxidized by preventing it from being exposed to the outside of the heating element structure. The second insulating layer 14 may be, for example, an oxide glass layer which may be the same as, or different from, the first insulating layer.

The oxide glass layer may include at least one of barium oxide (BaO), silicon oxide ($SiO_2$), aluminum oxide ($Al_2O_3$), boron oxide ($B_2O_3$), nickel oxide (NiO), cobalt oxide (CoO), strontium oxide (SrO), chromium oxide ($Cr_2O_3$), iron oxide ($Fe_2O_3$), magnesium oxide (MgO), titanium oxide ($TiO_2$), zirconium oxide ($ZrO_2$), lithium oxide ($Li_2O$), sodium oxide ($Na_2O$), or potassium oxide ($K_2O$). The oxide glass layer may include an enamel layer.

In the embodiments of FIGS. 1A to 1C, electricity may be supplied to the heating layer 12 across a first electrode 13a and a second electrode 13b from a power source (not shown). Since the heating layer 12 is between the two electrodes, the heating layer 12 may generate heat as an electric current is applied across the two electrodes and flows into the heating layer 12. When a leakage current occurs in the insulating layer 11, due to insufficient insulating characteristics of the insulating layer 11, an electric current may flow into the conductive metal substrate 10 through the insulating layer 11 from the electrodes, causing a spark in the heating element of the heating layer 12 and consequently an interruption in the operation of the heating device may occur.

To prevent these drawbacks, it would be desirable to improve the insulating characteristics of the insulating layer 11.

In the heating element structure according to one or more embodiments, particles may be added to the insulating layer 11 such that a difference between a coefficient of thermal expansion (CTE) of the matrix material and the CTE of the particles is about $4\times10^{-6}$ $K^{-1}$ or less. Without being limited by theory, the particles may block an electrical migration path in the insulating layer 11, and as a result, an electric current may not flow through the insulting layer 11.

In the heating element structures of FIGS. 1B and 1C, an additional upper layer (not shown) may be disposed on the heating layer 12. The upper layer may include a single layer or multiple layers.

FIG. 1A is a diagram illustrating a layout of the first electrode 13a and the second electrode 13b, also collectively referred to as electrodes 13, which are in a lower region of the heating layer 12, as illustrated in FIG. 1B and 1C.

In some embodiments, the heating layer 12 may have a thickness of about 10 micrometers (μm) to about 50 μm, for example, about 15 μm to about 45 μm, or about 20 μm to about 40 μm, or about 25 μm to about 35 μm, or about 30 μm. The electrodes 13 may have a thickness of about 5 μm to about 15 μm, or about 5 μm to about 10 μm, or about 5 μm to about 7.5 μm. The insulating layer 11 may have a thickness of about 50 μm to about 500 μm, and in some embodiments, about 100 μm to about 200 μm, and in some other embodiments, about 160 μm to about 180 μm. The conductive metal substrate 10 may have a thickness of about 100 μm to about 1000 μm, of about 200 μm to about 900 μm, or about 400 μm to about 850 μm, for example, about 800 μm.

In some other embodiments, the heating layer 12 may be disposed between the electrodes 13 and the conductive metal substrate 10.

Referring to FIG. 1A, with regard to the size of the cells defined by the electrodes 13, lengths A and B may each be about 10 millimeters (mm) to about 50 mm, and in some embodiments, about 35 mm to about 45 mm, and in some other embodiments, about 30 mm. A length C may be about 200 mm to about 600 mm, and in some embodiments, about 350 mm to about 450 mm, and in some other embodiments, about 420 mm. A length D may be about 200 mm to about 600 mm, and in some embodiments, about 350 mm to about 450 mm, and in some other embodiments, about 400 mm.

The matrix material in the insulating layer 11 may have a CTE of about $8\times10^{-6}$ $K^{-1}$ to about $12\times10^{-6}$ $K^{-1}$, or about $9\times10^{-6}$ $K^{-1}$ to about $11\times10^{-6}$ $K^{-1}$, or about $9\times10^{-6}$ $K^{-1}$ to about $11\times10^{-6}$ $K^{-1}$. The particle in the insulating layer 11 may have a CTE of about $7\times10^{-6}$ $K^{-1}$ to about $13\times10^{-6}$ $K^{-1}$, or about $8\times10^{-6}$ $K^{-1}$ to about $12\times10^{-6}$ $K^{-1}$, or about $10\times10^{-6}$ $K^{-1}$ to about $12\times10^{-6}$ $K^{-1}$. The CTE of the particle in the insulating layer 11 may be greater than the CTE of the matrix material. When the CTE of the particle in the insulating layer 11 is greater than the CTE of the matrix material, the insulating layer 11 may have improved insulating characteristics.

A difference in CTE between the matrix material and the particle may be about $4\times10^{-6}$ $K^{-1}$ or less, and in some embodiments, about $2\times10^{-6}$ $K^{-1}$ or less, and in some other embodiments, about $1\times10^{-6}$ $K^{-1}$ or less, and in still other embodiments, about 0.01 to about $1\times10^{-6}$ $K^{-1}$. The CTE may be measured using a thermo-mechanical analyzer (TMA 402 F1, NETZSCH, Germany). The CTE may be a measure of the change in a dimension (e.g., an elongated length) of a specimen as it is heated from room temperature (25° C.) to about 500° C.

The particle may include at least one of an oxide, a boride, a nitride, a carbide, or a chalcogenide. In some embodiments, the particle may include at least one of $Al_2O_3$, $Al_2SiO_5$, BeO, BN, $Mg_2Al_4Si_5O_{18}$, $Mg_2SiO_4$, $TiO_2$, $BaTiO_3$, $ZrO_2$, $SiO_2$, or MgO. For example, the particle may include at least one selected of MgO, $Mg_2SiO_4$, or $TiO_2$. As the particle, $Al_2O_3$ may have a CTE of about $8\times10^{-6}$/K, and $ZrO_2$ may have a CTE of about $7\times10^{-6}$/K.

The particle may have a dielectric strength of about 5 kilovolts per millimeter (kV/mm) or greater. The dielectric strength of the above-listed particle materials, i.e., $Al_2O_3$, $Al_2SiO_5$, BeO, BN, $Mg_2Al_4Si_5O_{18}$, $Mg_2SiO_4$, $TiO_2$, $BaTiO_3$, $ZrO_2$, $SiO_2$, and MgO, are represented in Table 1.

TABLE 1

| Composition | Dielectric strength (kV/mm) |
|---|---|
| $Al_2O_3$ | 13.4 |
| $Al_2SiO_5$ | 5.9 |
| BeO | 13.8 |
| BN | 37.4 |
| $Mg_2Al_4Si_5O_{18}$ | 7.9 |
| $Mg_2SiO_4$ | 9.8 |
| $TiO_2$ | 20-120 |
| $BaTiO_3$ | 30 |
| $ZrO_2$ | 11.4 |
| $SiO_2$ | 470-670 |
| MgO | 10-30 |

The amount of the particle in the insulating layer 11 may be about 1 weight percent (wt %) to about 10 wt %, or about 1 wt % to about 7 wt %, for example, about 2 wt % to about 5 wt %, based on a total weight of the matrix material and the particle. The particle in the insulating layer 11 may have a size of about 1 nm to about 10 μ, and in some embodiments, about 10 nm to about 100 nm, and in some other embodiments, about 20 nm to about 80 nm, and in still other embodiments, about 40 nm to about 60 nm, and in yet still other embodiments, about 50 nm. The amount of the particle in the insulating layer 11 may be varied depending on a particle size (i.e., a dimension) or a specific surface area of the particle. For example, when the particle of the insulating layer 11 is relatively small, for example about 1 nm to about 100 nm, the amount of the particle in the insulating layer 11 may be in a range of about 1 wt % to about 5 wt %.

As used herein, the term "size" of the particle may refer to an average particle diameter when the particle is spherical, or a length of the major axis when the particle is non-spherical.

The matrix material in the insulating layer 11 may include at least one of a non-oxide glass, an oxide glass, a ceramic-glass composite, or a polymer. For example, the matrix material may include at least one of $SiO_2$, BaO, $B_2O_3$, $Al_2O_3$, MgO, $ZrO_2$, CuO, NiO, CoO, MnO, $TiO_2$, $K_2O$, $Na_2O$, $Li_2O$, $P_2O_4$, ZnO, $Y_2O_3$, $K_2O$, CaO, SrO, $Cr_2O_3$, or $Fe_2O_3$.

The matrix material may be a polymer have a melting temperature (Tm) of, for example, about 200° C. or greater. For example, the polymer may be at least one of a polyimide, a polyphenylene sulfide, a polybutylene terephthalate, a polyamideimide, a crystalline polymer, a polyethylene terephthalate, or a polyetheretherketone (PEEK).

The ceramic-glass composite as the matrix material may be any suitable ceramic-glass composite.

The matrix material may include an oxide glass including BaO, $SiO_2$, $Al_2O_3$, $B_2O_3$, NiO, CoO, at least one of SrO, $Cr_2O_3$, or $Fe_2O_3$, or at least one of $Li_2O$, $Na_2O$, or $K_2O$. A weight ratio of BaO to the $SiO_2$ may be about 1:1 to about 5:1. The amount of NiO may be about 0.1 wt % to about 30 wt %, the amount of CoO may be about 1 wt % to about 30 wt %, the amount of the at least one of SrO, $Cr_2O_3$, or $Fe_2O_3$, may be about 0.1 wt % to about 30 wt %, and the amount of the at least one of $Li_2O$, $Na_2O$, or $K_2O$ may be about 0.1 wt % to about 2.2 wt %, each based on a total weight of the oxide glass.

For example, a weight ratio of BaO to $SiO_2$ may be about 1:1 to about 3.1:1, or about 1.1:1 to about 2.5:1, and in some embodiments, about 1.3:1 to about 2:1. When the weight ratio of BaO to $SiO_2$ is within these ranges, a stress due to the thermal deformation of the insulating layer 11 may be small.

The amount of BaO may be, for example, about 0.1 wt % to about 55 wt %, or about 0.1 wt % to about 45 wt %, and in some embodiments, about 0.1 wt % to about 40 wt %, and the amount of $SiO_2$ may be, for example, about 0.1 wt % to about 40 wt %, or about 0.1 wt % to about 30 wt %, and in some embodiments, about 0.1 wt % to about 25 wt %, each based on the total weight of the oxide glass.

The amount of $Al_2O_3$ may be, for example, about 0.1 wt % to about 10 wt %, or about 0.1 wt % to about 5 wt %, and in some embodiments, about 0.1 wt % to about 1 wt %, and the amount of $B_2O3$ may be, for example, about 0.1 wt % to about 20 wt %, or about 0.1 wt % to about 18 wt % and in some embodiments, about 0.1 wt % to about 15 wt %, each based on the total weight of the oxide glass.

The amount of CoO may be, for example, about 1 wt % to about 10 wt %, or about 1 wt % to about 7 wt % and in some embodiments, about 1.1 wt % to about 5 wt %; the amount of the at least one of SrO, $Cr_2O_3$, or $Fe_2O_3$ may be, for example, about 10 wt % to about 30 wt %, or about 15 wt % to about 30 wt %, and in some embodiments, about 20 wt % to about 29 wt %; and the amount of the at least one of $Li_2O$, $Na_2O$, or $K_2O$ may be, for example, about 0.1 wt % to about 1 wt %, or about 0.15 wt % to about 0.75 wt % and in some embodiments, about 0.2 wt % to about 0.5 wt %, each based on the total weight of the oxide glass.

The matrix material of the insulating layer 11 may include an oxide glass including BaO, $SiO_2$, $Al_2O_3$, $B_2O_3$, NiO, CoO, at least one of SrO, $Cr_2O_3$, $Fe_2O_3$, MgO, $TiO_2$ or $ZrO_2$, and at least one of $Li_2O$, $Na_2O$ or $K_2O$.

The matrix material of the insulating layer 11 according to one or more embodiments may include an oxide glass including BaO, $SiO_2$, $Al_2O_3$, $B_2O_3$, NiO, CoO, a mixture of SrO, $Cr_2O_3$, $Fe_2O_3$, MgO, $TiO_2$, and $ZrO_2$, and a mixture of $Li_2O$, $Na_2O$ and $K_2O$.

The particle of the insulating layer 11 according to one or more embodiment may include at least one of MgO, $Mg_2SiO_4$, or $TiO_2$. The particle of the insulating layer 11 may have, for example, a dielectric strength of about 5 kV/mm or greater.

In some embodiments, the matrix material may be an oxide glass including BaO (component A), $SiO_2$ (component B), $Al_2O_3$ (component C), $B_2O_3$ (component D), NiO (component E), CoO (component F), at least one component (component G) selected from SrO, $Cr_2O_3$, $Fe_2O_3$, MgO, $TiO_2$, and $ZrO_2$, at least one component (component H) selected from $Li_2O$, $Na_2O$ and $K_2O$, and at least one component (component I) selected from CaO, $TiO_2$, ZnO and $ZrO_2$. A weight ratio of the component A to the component B may be about 1:1 to about 5:1. The amount of the component E may be about 0.1 wt % to about 30.0 wt %, the amount of the component F may be about 0.1 wt % to about 30.0 wt %, the amount of the component G may be about 0.1 wt % to about 30.0 wt %, the amount of the component H may be about 0.1 wt % to about 2.2 wt %, and the amount of the component I may be about 0.1 wt % to about 5.0 wt %, each based on a total weight of the oxide glass.

For example, a weight ratio of BaO to $SiO_2$ may be about 1:1 to about 3.1:1, or about 1:2 to about 2:1, and in some embodiments, about 1.3:1 to about 1.7:1. When the weight ratio of BaO to $SiO_2$ is within these ranges, a stress by the thermal deformation of the insulating layer 11 may be small.

The amount of BaO may be, for example, about 0.1 wt % to about 55 wt %, or about 0.1 wt % to about 45 wt %, and in some embodiments, about 0.1 wt % to about 40 wt %, and the amount of $SiO_2$ may be, for example, about 0.1 wt % to about 40 wt %, or about 0.1 wt % to about 30 wt %, and in some embodiments, about 0.1 wt % to about 25 wt %, each based on the total weight of the oxide glass.

The amount of $Al_2O_3$ may be, for example, about 0.1 wt % to about 10 wt %, or about 0.1 wt % to about 5 wt %, and in some embodiments, about 0.1 wt % to about 1.0 wt %, and the amount of $B_2O_3$ may be, for example, about 0.1 wt % to about 20 wt %, about 0.1 wt % to about 18 wt %, and in some embodiments, about 0.1 wt % to about 15.0 wt %, each based on the total weight of the oxide glass.

The amount of CoO may be, for example, about 1 wt % to about 10 wt %, or about 1 wt % to about 8 wt %, and in some embodiments, about 1.1 wt % to about 5 wt %; the amount of the at least one of SrO, $Cr_2O_3$, $Fe_2O_3$, MgO, $TiO_2$, or $ZrO_2$ may be, for example, 10 wt % to about 30 wt %, or about 15 wt % to about 30 wt %, and in some embodiments, about 20 wt % to about 29 wt %; the amount of the at least one of $Li_2O$, $Na_2O$ or $K_2O$ may be, for example, about 0.1 wt % to about 1 wt %, or about 0.2 wt % to about 0.8 wt %, and in some embodiments, about 0.2 wt % to about 0.5 wt %; and the amount of the at least one of CaO, $TiO_2$, ZnO or $ZrO_2$ may be, for example, about 0.1 wt % to about 5 wt %, or about 0.2 wt % to about 4 wt %, and in some embodiments, about 0.5 wt % to about 3 wt %, each based on the total weight of the oxide glass.

In some embodiments, the insulating layer 11 including a matrix material and particles as described above may have a dielectric strength which is at least about 10% or greater, for example, about 20% or greater, compared to the dielectric strength of an insulating layer consisting of only a matrix material.

In the heating element structure according to one or more embodiments, the conductive metal substrate 10, as a layer supporting the heating element structure, may include a material having strong mechanical strength. In some embodiments, the conductive metal substrate may be a steel plate, for example, a steel plate porcelain (SPP) substrate.

The heating layer 12 may be spaced apart from the conductive metal substrate 10 and may generate heat in response to an electrical signal. The heating layer 12 may include a material having a high electrical conductivity in order to facilitate generation of heat. For example, the heating layer 12 may include a plurality of nanostructures having a high electrical conductivity. The electrical conductivity of the heating layer 12 may be adjusted according to the quantity of the nanostructures. For example, the higher the quantity of the plurality of nanostructures, the higher the electrical conductivity of the heating layer 12.

For example, the heating layer 12 may include filler, for example, a plurality of fillers in the matrix material thereof. The matrix material of the heating layer 12 may include a glass material. For example, the matrix material of the heating layer 12 may include a glass frit or an enamel powder.

In some embodiments, the matrix material of the heating layer 12 may include a glass formed from a frit. The glass frit may include one oxide of, for example, a silicon oxide, a lithium oxide, a nickel oxide, a cobalt oxide, a boron oxide, a potassium oxide, an aluminum oxide, a titanium oxide, a manganese oxide, a copper oxide, a zirconium oxide, a phosphorus oxide, a zinc oxide, a bismuth oxide, a lead oxide, or a sodium oxide. Any one or more of the foregoing compounds, or their hydrates or other oxides may be present in the glass of the matrix particles. The glass frit may include a silicon oxide including an additive added thereto. The additive may include at least one of Li, Ni, Co, B, K, Al, Ti, Mn, Cu, Zr, P, Zn, Bi, Pb, or Na. However, the additive is not limited to these listed elements.

In some other embodiments, the matrix material of the heating layer 20 may include an organic material having heat resistance, for example, a polymer. Examples of the polymer as a matrix material of the heating layer 20 may be the same as the polymers of the insulating layer 11 as described above. The plurality of fillers may include a nano material. For example, the plurality of fillers may be fillers in a form of a nano-sheet, a nano-rod, or a combination thereof. The fillers in a nano-sheet or nano-rod form may include various materials. A nano-sheet or nano-rod may have a composition having an electrical conductivity of, for example, about 1,250 Siemens per meter (S/m), but may be less or greater depending on the case.

The fillers in a nano-sheet or nano-rod form may include at least one of an oxide, a boride, a carbide, or a chalcogenide. The oxide used as the filler may include, for example, $RuO_2$, $MnO_2$, $ReO_2$, $VO_2$, $OsO_2$, $TaO_2$, $IrO_2$, $NbO_2$, $WO_2$, $GaO_2$, $MoO_2$, $InO_2$, $CrO_2$, or $RhO_2$. The boride used as the filler may include, for example, $Ta_3B_4$, $Nb_3B_4$, TaB, NbB, $V_3B_4$, or VB. The carbide used as the filler may include, for example, $Dy_2C$ or $Ho_2C$. The chalcogenide used as the filler may include, for example, $AuTe_2$, $PdTe_2$, $PtTe_2$, $YTe_3$, $CuTe_2$, $NiTe_2$, $IrTe_2$, $PrTe_3$, $NdTe_3$, $SmTe_3$, $GdTe_3$, $TbTe_3$, $DyTe_3$, $HoTe_3$, $ErTe_3$, $CeTe_3$, $LaTe_3$, $TiSe_2$, $TiTe_2$, $ZrTe_2$, $HfTe_2$, $TaSe_2$, $TaTe_2$, $TiS_2$, $NbS_2$, $TaS_2$, $Hf_3Te_2$, $VSe_2$, $VTe_2$, $NbTe_2$, $LaTe_2$, or $CeTe_2$.

The fillers in the heating layer 12 may have a thickness of about 1 nm to about 1,000 nm and a size of about 0.1 μm to about 500 μm. As used herein, the term "size" refers to an average particle diameter when the fillers are spherical, or a length of the major axis when the fillers are non-spherical.

The amount of the fillers in the heating layer 12 may be about 0.1 wt % to about 100 wt %. In some embodiments, the amount of the fillers in the heating layer 12 may be about 1 wt % to about 20 wt %, for example, about 1 wt % to about 10 wt %, based on a total weight of the heating layer 12.

In some embodiments, the heating layer 12 may include at least one heating element, for example, ruthenium oxide ($RuO_2$), a silver-palladium alloy, or carbon nanotubes (CNTs).

The heating layer 12 may be distributed over an entire surface of the conductive metal substrate 10. For example, an overlapping region between the heating layer 12 and the conductive metal substrate 10 may be about 70% or greater, or about 75% or greater, or about 80% or greater, or about 90% or greater, of the total surface of the conductive metal substrate 10. Accordingly, heat may be generated on the entire surface of the conductive metal substrate 10, which may thus be referred to as planar-type heating.

A plurality of heating layers may be arranged on the conductive metal substrate. The plurality of heating layers may be arranged on the conductive metal substrate spaced apart from one another in one dimension or in two dimensions. Since there are small spaces between the plurality of heating layers, the plurality of heating layers may be prevented from being bent due to thermal expansion even when the plurality of heating layers are expanded by heat.

In some embodiments, one heating layer 12 may be provided. For example, the heating layer 12 may be disposed in a center region of the conductive metal substrate 10. When only one heating layer 12 is provided, the heating layer 12 may include at least one opening so that it does not undergo a shape change even when the heating layer 12 expands due to heat.

The electrodes 13 (i.e., the first and second electrodes 13a and 13b) may be arranged so as to be in contact with the heating layer 12. The electrodes 13 may include a first electrode 13a in contact with a first region of the heating layer 12, and a second electrode 13b in contact with a second region of the heating layer 12 and opposite the first electrode 13a. Such a pair of first and second electrodes 13a and 13b may be arranged on each heating layer 12 so as to provide electrical signals to the heating layer 12. Accordingly, the heating layer 12 may generate heat in response to the electrical signals.

The first electrode 13a and the second electrode 13b may include a material having excellent electrical conductivity. The first electrode 13a and the second electrode 13b may include at least one of Ag, Al, indium tin oxide (ITO), Cu, Mo, or Pt. However, embodiments are not limited thereto. The first electrode 13a and the second electrode 13b may have a thickness of about 5 μm to about 10 μm.

The first insulating layer 11 may be disposed between the first and second electrodes 13a and 13b and the conductive metal substrate 10 to prevent a leakage current between the conductive metal substrate 10 and the first and second electrodes 13a and 13b or between the conductive metal substrate 10 and the heating layer 12. The first insulating layer 11 may include a material having good adhesion to the heating layer 12. In some embodiments, the conductive metal substrate 10, the heating layer 12, the first insulating layer 11, and a second insulating layer 14 may have a similar coefficient of thermal expansion.

Figure 2A:
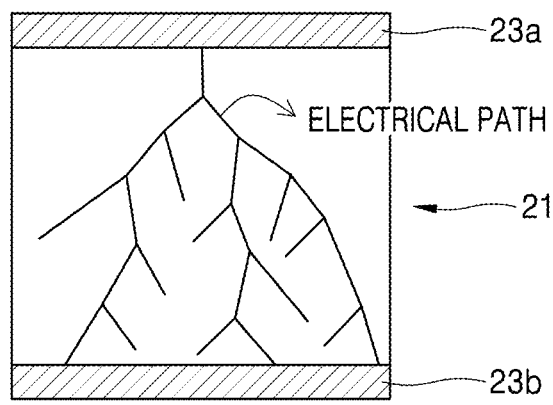
FIG. 2A is a schematic view explaining the formation of an electrical path in an insulating layer of a heating element structure, of the prior art.
Figure 2B:
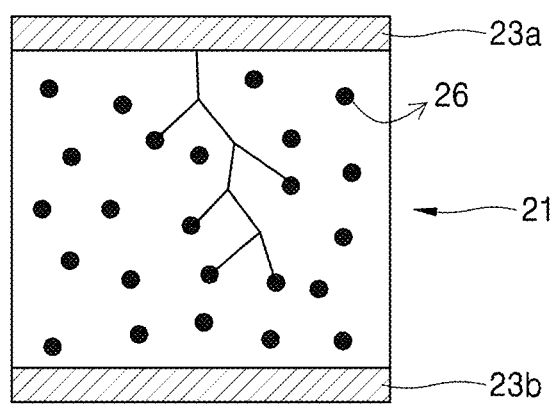
FIG. 2B is a schematic view explaining a process of blocking the formation of an electrical path in an insulating layer of a heating element structure, according to an embodiment.

FIG. 2A is a schematic view explaining the formation of an electrical path in an insulating layer 21 of a prior art heating element structure. FIG. 2B is a schematic view explaining a process of blocking the formation of an electrical path in an insulating layer 21 of a heating element structure according to an embodiment, in comparison with FIG. 2A.

As described above, the first insulating layer 11 of the heating element structure according one or more embodiments may include, in addition to a matrix material as described above, a particle having a difference in CTE of about $4 \times 10^{-6}$ K$^{-1}$ or less with respect to the matrix material. When the insulating layer 21 includes only a matrix material as illustrated in FIG. 2A, electricity may flow through the electrical path generated between first and second electrodes 23a and 23b, causing a leakage in the current. However, when the insulating layer 21 includes a matrix material and a particle 26, according to one or more embodiments, as illustrated in FIG. 2B, a current may not flow in the insulating layer 21 due to blocking of the electrical path by the particle 26.

Hereinafter, embodiments of a method of forming a heating element structure according to any of the above-described embodiments will be described in detail.

According to one or more embodiments, the method of forming a heating element structure according to any of the above-described embodiments may include providing an insulating layer composition including a matrix material and a particle, applying the insulating layer composition on a surface of the conductive metal substrate, and thermally treating the resulting structure (e.g., the insulating layer composition on the surface of the conductive metal substrate) to form the insulting layer.

The insulating layer composition may be applied (e.g., coated) onto a surface of the conductive metal substrate by using a variety of methods, including spin coating, bar coating, printing, and doctor blading.

Then, electrodes and a heating layer according to any of the above-described embodiments may be disposed (formed) on the insulating layer formed in the above-described step, thereby forming a heating element structure according to an embodiment having a structure as illustrated in any of FIGS. 1A to 1D. In the heating element structure of FIG. 1D, the heating layer 12 may be disposed between the first electrode 13a and the second electrode 13b.

In the forming of the insulating layer, the thermal treatment conditions may be varied depending on the type of the matrix material, the type of the particle, and a mixing ratio thereof. For example, the thermal treatment may be performed at a temperature of about 600° C. to about 1000° C., or about 650° C. to about 950° C. When the thermal treatment is within this range, a heating element structure having improved insulating characteristics may be obtained.

The insulating layer composition may include a solvent and a binder. For example, the solvent may be water. For example, the binder, as a material for maintaining binding strength of the insulating layer to the conductive metal substrate, may be at least one compound selected from the group consisting of hydroxypropylmethyl cellulose (HPMC), hydroxyethylmethyl cellulose (HEMC), and hydroxyethyl cellulose (HEC).

The amount of the binder may be about 0.1 parts by weight to about 3 parts by weight, for example, or about 0.2 parts by weight to about 2 parts by weight, or about 0.25 parts by weight to about 1 part by weight, based on 100 parts by weight of the insulating layer composition.

A solid content in the insulating layer composition may be in a range of about 40 wt % to about 70 wt %, based on a total weight of the insulating layer composition.

The applying of the insulating layer composition onto the conductive metal substrate may be performed using a coating method, for example, spray coating, screen printing, ink-jet deposition, dip coating, or spin coating.

After the applying of the insulating layer composition including a matrix material and a particle on a surface of the conductive metal substrate, and before the thermal treatment to form the insulating layer, a thermal pre-treatment step may be performed at a temperature of about 80° C. to about 110° C. in order to remove the solvent.

The electrodes may be disposed (e.g., formed) on the insulating layer. The electrodes may include, for example, silver.

Next, the heating layer may be formed on the electrodes and/or the heating layer. The heating layer includes a heating element.

In some embodiments, after the heating layer including a heating element is formed on the insulating layer, the electrodes may be disposed on opposite side regions of the heating layer including the heating element, respectively.

Embodiments of the method of forming the heating layer will be described below.

The heating layer may be formed using any suitable method. For example, the heating layer may be formed by coating a heating layer composition including a matrix material and a filler on the electrodes and thermally treating the coated composition.

The coating may be performed using any of a variety of methods, including spray coating, bar coating, and printing. The thermal treatment may be performed at a temperature of about 400° C. to about 900° C., or about 450° C. to about 900° C., for example, at about 500° C. to about 900° C. A drying step to remove the solvent may be performed before the thermal treatment. The drying may be performed at a temperature of about 100° C. to about 200° C.

The time for thermal treatment of the heating layer composition may be varied depending on the thermal treatment temperature. The thermal treatment may be performed for about 1 minute to about 1 hour, for example, for about 1 minute to about 20 minutes.

In some embodiments, the heating layer may be a heating layer as disclosed in KR 10-2016-139285, the disclosure of which in its entirety is incorporated herein by reference.

The filler in the heating layer may be prepared as described below.

First, a filler including a nanomaterial, for example, a RuO$_{(2+x)}$ nanosheet (wherein 0≤x≤0.1), may be prepared. Fillers including other types of nanomaterials may also be prepared in a similar or identical process of preparing the RuO$_{(2+x)}$ nanosheet (wherein 0≤x≤0.1).

To prepare a RuO$_{(2+x)}$ nanosheet, K$_2$CO$_3$ and RuO$_2$ may be mixed together and formed into pellets. The pellets may be put into an alumina crucible and then into a tube furnace where the pellets may be thermally treated at a temperature of about 600° C. to about 950° C., or about 650° C. to about 900° C., or about 700° C. to about 900° C., for example, at about 850° C., for about 5 hours to 20 hours, or about 7 hours to about 15 hours, or about 10 hours to about 13 hours, for example, about 12 hours. A molar ratio of K$_2$CO$_3$ to RuO$_2$ may be, for example, about 5:8.

The thermal treatment of the pellets may be performed in a nitrogen atmosphere.

After the thermal treatment, once the tube furnace is cooled down to room temperature, the alumina crucible may be taken out of the tube, and then the pellets may be removed from the alumina crucible to grind the pellets into powder. The obtained powder may be washed with water and filtered to obtain a K$_{0.2}$RuO$_{2.1}$ powder.

The obtained powder may be mixed with an acid solution, for example, a 1 molar (M) HCl aqueous solution, stirred, and filtered to obtain a H$_{0.2}$RuO$_{2.1}$ powder. The stirring may be performed for, for example, 2 days to 5 days, for example, 3 days.

Next, 1 gram (g) of the H$_{0.2}$RuO$_{2.1}$ powder may be added to 250 milliliters (mL) of an aqueous solution of an intercalant mixture including, for example, tetramethylammonium hydroxide (TMAOH) and tetrabutylammonium hydroxide (TBAOH), and then stirred. The reaction time may be, for example, about 10 days or more. The ratio of TMAOH and TBAOH, as measured by the concentration of TMA+/H+ and TBA+/H+, respectively, may be about 0.1:1 to about 50:1. After the stirring is completed, the resulting solution may be centrifuged at, for example, about 2,000 rpm for about 30 minutes, thereby obtaining a $RuO_2$ nanosheet aqueous solution phase containing $RuO_{(2+x)}$ nanosheets exfoliated by the centrifugation, and a phase including a precipitate of the powder which remains unexfoliated.

Next, a volume of the $RuO_2$ nanosheet aqueous solution, containing a desired weight of $RuO_2$ nanosheets, was measured and then centrifuged to separate the $RuO_{(2+x)}$ nanosheets from the solvent, thereby obtaining a filler including the desired nanomaterial. The centrifugation may be performed at a speed of about 10,000 rotations per minute (rpm) or greater for about 15 minutes or greater.

The resulting $RuO_{(2+x)}$ nanosheets product, obtained by separating the solvent from the $RuO_2$ nanosheets, may then be mixed with a matrix material. The added amount of the matrix material may be about 1 part by weight to about 10 parts by weight with respect to 100 parts by weight of the heating layer. The amount of the matrix material in the heating layer may vary depending on a predetermined amount of the $RuO_2$ nanosheets.

The matrix material may be, for example, an oxide glass including a mixture of silicon oxide, lithium oxide, nickel oxide, cobalt oxide, boron oxide, potassium oxide, aluminum oxide, titanium oxide, manganese oxide, copper oxide, zirconium oxide, and sodium oxide.

Next, the mixture of the $RuO_2$ nanosheet and the matrix material may be coated on a substrate. The substrate may have the same composition as, or a different composition from, that of the matrix material. The substrate may be, for example, a silicon wafer or a metal substrate. The coating of the mixture may be performed using, for example, screen printing, ink-jet deposition, dip coating, spin coating, or spray coating.

Next, after the coating is completed, the resulting coated product may be dried at a temperature of about 100° C. to about 200° C. to remove the solvent therefrom. The solvent-removed coated product may then be thermally treated at a temperature of about 500° C. to about 900° C., or about 550° C. to about 750° C., for about 1 minute to about 20 minutes, or about 1 minute to about 10 minutes, for example, at about 600° C. for about 2 minutes. Through the above-described processes, a target heating layer may be obtained.

According to another aspect of the inventive concept, a heating device includes a heating element structure according to any of the above-described embodiments.

Figure 5:
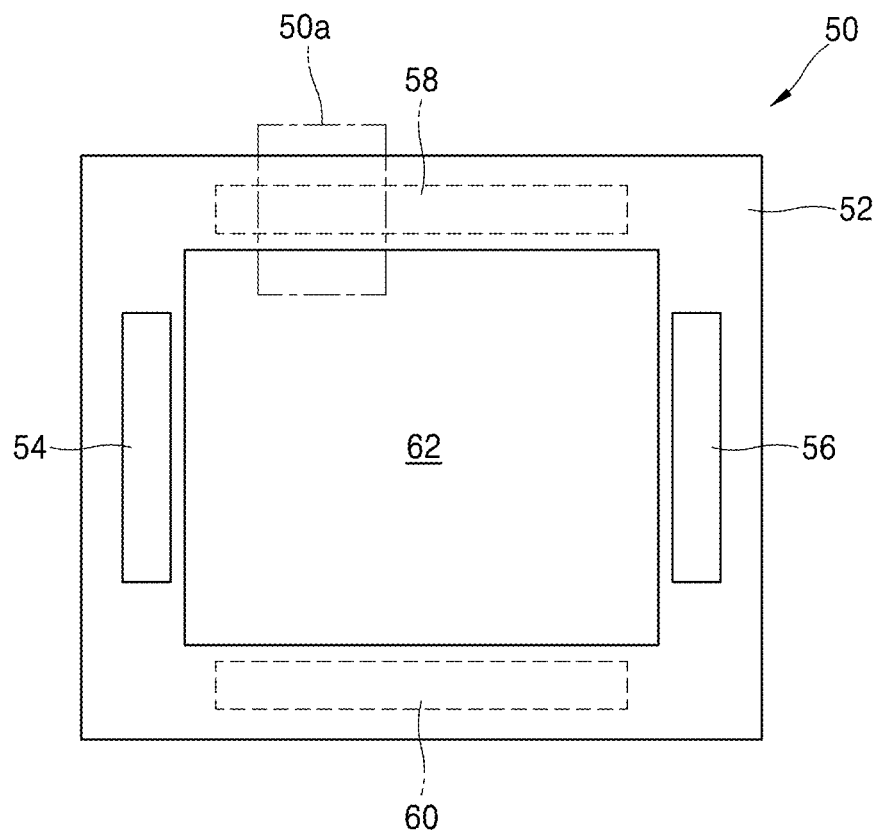
FIG. 5 is a top view of a device including a heating element structure as a heat source, according to an embodiment.

FIG. 5 is a top view of a heating device according to an embodiment including a heating element structure according to any of the above-described embodiments.

Referring to FIG. 5, the heating device 50 may include a body 52, and a first heating element 54 in the body 52. The heating device 50 may be an electrical device or an electronic device, for example, an oven. The body 82 of the device 80 may include an inner space 62 in which an object, for example, food, may be placed. When the heating device 50 is operated, energy (for example, heat) for heating the object in the inner space 62 or increasing the temperature of the inner space 92 may be supplied. The first heating element 54 may be arranged such that heat generated from the first heating element 54 is directed to the inner space 62. The first heating element 54 may be a heating element structure according to any of the above-described embodiments.

A second heating element 56 may be further arranged in the body 52 opposite to the first heating element 54, such that heat generated from the second heating element 56 is directed to the inner space 62, like the first heating element 54. The second heating element 56 may be a heating element structure according to any of the above-described embodiments. The first and second heating elements 54 and 56 may be the same or different from one another. In some embodiments, a third heating element 58 and a fourth heating element 60 may further be arranged in the body 52, as indicated by dashed lines in FIG. 5. In some other embodiments, one of the third heating element 58 and the fourth heating element 60 may be included in the body 52.

In some other embodiments, only the third and fourth heating elements 58 and 60 may be included in the body 52. One of an insulating member and a heat-reflecting member may be arranged between each of the first to fourth heating elements 54, 56, 58, and 60 and a corresponding outer boundary of the body 52.

The first to fourth heating elements 54, 56, 58, and 60 may be 2-dimensional planar heating elements, i.e., a planar heating element having a 2-dimensional area. These 2-dimensional planar heating elements may be a heating element structure according to any of the above-described embodiments.

Figure 6:
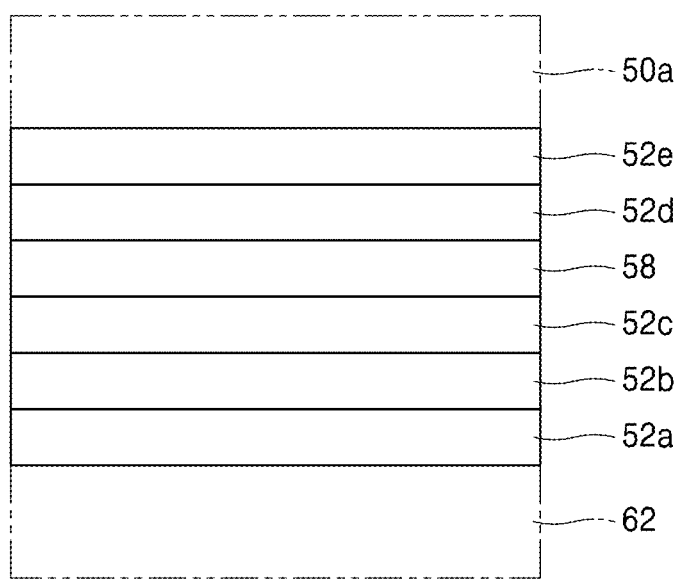
FIG. 6 is an enlarged cross-sectional view of a first region 50a in FIG. 5.

FIG. 6 is an enlarged cross-sectional view of a first region 50a in the heating device of FIG. 5.

Referring to FIG. 6, an insulating material 52d and a case 52e may be disposed in this stated order between the third heating element 58 and an outer boundary of the body 52. The case 52e may be an outer case of the heating device 50. The insulating material 52d between the case 52e and the third heating element 58 may extend to the other regions of the body 52 in which the first, second, and fourth heating elements 54, 56, and 60 are arranged. The insulating material 52d is configured to block release of the heat generated by the third heating element 58 from the heating device 50.

A second insulating layer 52c, a substrate 52b, and a first insulating layer 52a may be between the third heating element 58 and the inner space 52. The first insulating layer 52a, the substrate 52b, the second insulating layer 52c, and the third heating element 58 may be sequentially arranged as a laminated structure, in the stated order from the inner space 62 toward outside of the heating device 50. This laminated structure may apply to the regions of the body 52 in which the first, second, and fourth heating elements 54, 56, and 60 are arranged.

The first and second insulating layers 52a and 52c may be formed of the same insulating material, or different insulating materials. At least one of the first and second insulating layers 52a and 52c may be an enamel layer. However, embodiments are not limited thereto. Thicknesses of the first and second insulating layers 52a and 52c may be the same or different. The substrate 52b may a support member for at least one of the first to fourth heating elements 54, 56, 58, and 60, maintaining the structure of the body 52. The substrate 52b may be, for example, a metal plate. However, embodiments are not limited thereto. A heating element (e.g., third heating element 88) including the laminated structure as illustrated in FIG. 6 may be applied to any type of heating device (for example, an electric pot for heating water), and not only to a heating device as illustrated in FIG. 6. For example, when a heating element according to embodiment, for example the third heating element 58, is arranged on a bottom of a device, and an object to absorb heat is arranged above the third heating element 58, the insulating material 52d may be arranged under the heating element.

Figure 7A:
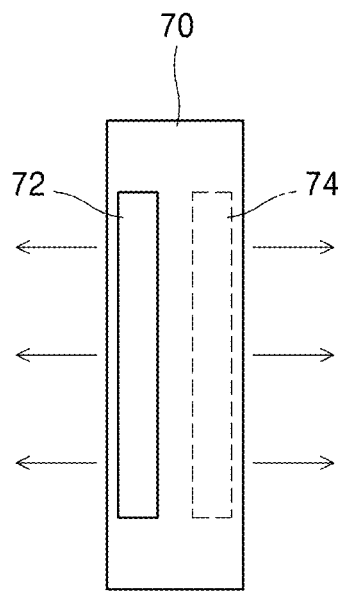
FIGS. 7A and 7B illustrate heating devices including heating element structures, according to embodiments.
Figure 7B:
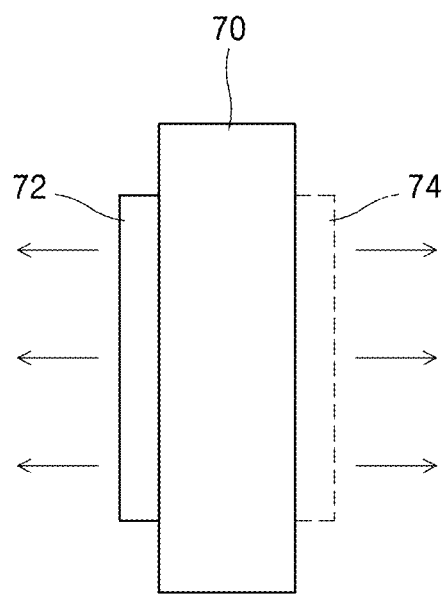

FIGS. 7A and 7B illustrate heating devices according to embodiments including a heating element structure according to any one of the above-described structures. The heating devices of FIGS. 7A and 7B may be heating systems.

Referring to FIG. 7A, a first heating device 72 may be disposed within a wall 70. The first heating device 72 may emit heat through a first surface of the wall 72. When the wall 72 is a wall dividing a room from another room, the first heating device 72 may be configured to emit heat to increase the temperature of a room or to heat the room. As illustrated in FIGS. 7A and 7B, the first heating device 72 may be installed on a surface of the wall 100. In some embodiments, the first heating device 72 may be installed so as to be separate from the wall 70, although this is not illustrated. When the first device 72 is separate from the wall 70 the first device 72 may be a movable, independent device, which may be moved to any location in a room by a user.

The first device 72 may include a heating element structure according to any of the above-described embodiments. The first heating device 72 may be entirely embedded in the wall 70, with an operation panel of the first heating device 72 arranged on a surface of the wall 70. The wall 72 may further include a second heating device 74. The second heating device 74 may be configured to emit heat through a second surface of the wall 70. When the wall 70 is a wall dividing a room from another room, the second heating device 74 may be configured to emit heat so as to heat one of the rooms, or areas adjacent to each room, with the wall 70 there between. As illustrated in FIG. B, the first heating device 72 and/or the second heating device 74 may also be installed on a surface of the wall 70. In some embodiments, like the first heating device 72, the second heating device 74 may be separate from the wall 100, although not illustrated. The second surface may be a surface of the wall 70 opposite to the first surface or a surface of a wall facing the first surface of the wall 70. The second heating device 74 may include a heating element structure (not shown) generating heat. The heating element structure may be a heat source for increasing the temperature of an area outside of, or adjacent to, the second surface of the wall 70. The second heating device 74 may be entirely embedded in the wall 70, with an operation panel of the second device 74 arranged on a surface of the wall 70. In FIGS. 7A and 7B, the arrows indicate the direction in which heat is emitted from the first and second devices 72 and 74.

The first and second heating devices 72 and 74 may have a detachable structure. In this case, the first heating device 72 or the second heating device 74 may be mounted on an inner surface of a window. For example, with the assumption that the wall 70 in FIG. 7 is a window, the first heating device 72 may be mounted on an inner surface of the window. In this case, the second heating device 74 is not present. When the first heating device 72 is mounted on a window, the first heating device 72 may be mounted on a portion of the inner surface of the window or on an entire inner surface of the window.

Figure 8:
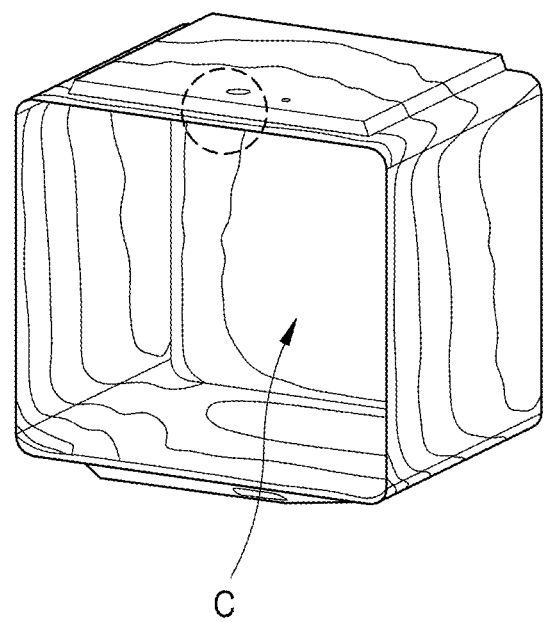
FIG. 8 illustrates a heating device including a heating element structure, according to an embodiment.

FIG. 8 illustrates a heating device according to an embodiment including a heating element structure according to any of the above-described embodiments.

Referring to FIG. 8, the heating device according to an embodiment may be an electric oven. The heating device may have a hexahedral form including five faces and one cavity C which opens toward the front of the heating device. An object to be heated, such as food, may be placed in the cavity C. In the heating device of FIG. 8, at least two surfaces thereof (for example, upper and lower surface, or two opposite side surfaces) or four surfaces (for example, upper, lower, and two opposite side surfaces) may include a heating element structure as described above with reference to FIGS. 1A to 1D. The heating element structure may be positioned, for example, in an area as indicated by the circled portion in FIG. 8.

Figure 9:
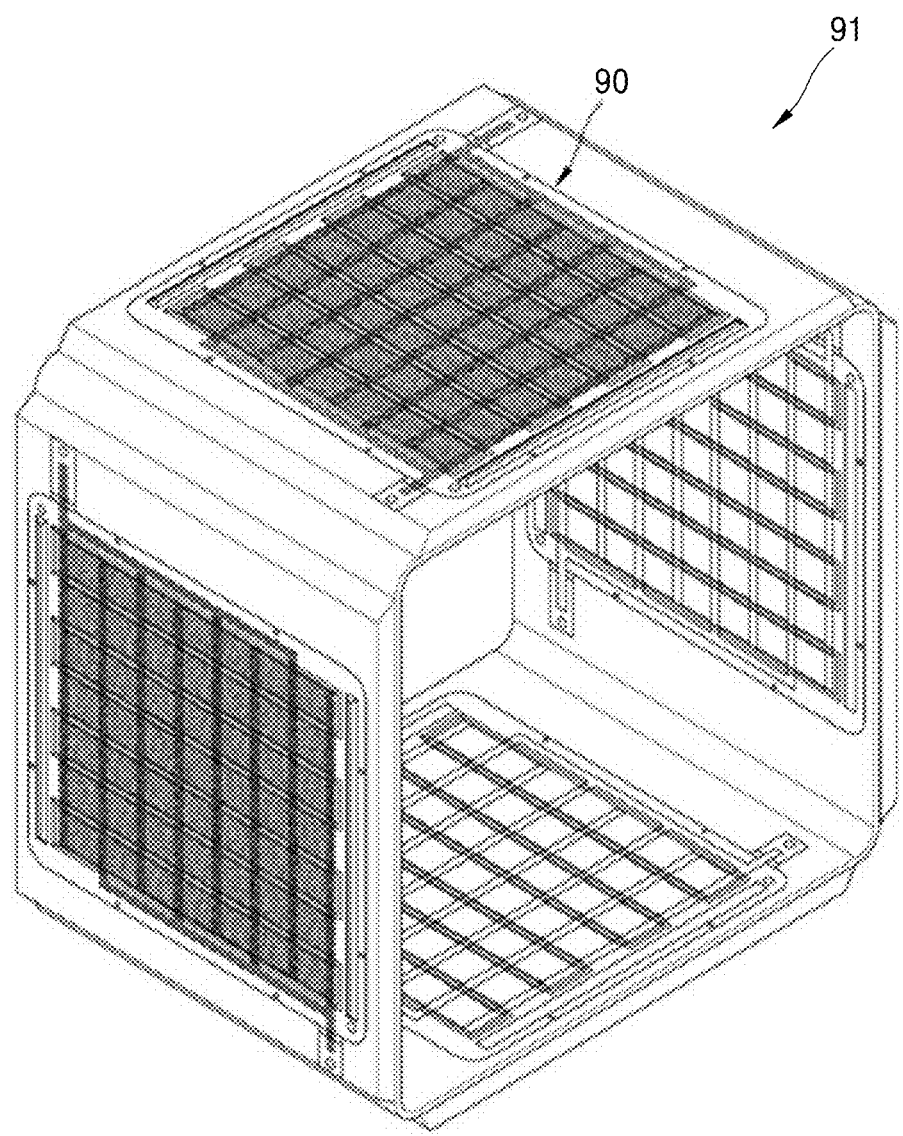
FIG. 9 illustrates a heating device including a heating element structure, according to an embodiment.

FIG. 9 illustrates a structure of a heating oven 91 including planar heating elements 90. Referring to FIG. 9, the planar heating oven 91 may include planar heating elements 90 in each of the five surfaces including upper, lower, left, right, and rear surfaces. The planar heating elements 90 may include heating element structures according to embodiments as described above.

In some embodiments, a heating element structure according to an embodiment as disclosed above may be applied to any means or device which may warm a user. For example, a heating element structure according to an embodiment may be applied to wearable clothing (for example, a jacket, a vest, or the like), gloves, shoes, or the like. A heating element structure according to an embodiment may be included in cloth fabric or an inner side of clothing.

In some other embodiments, a heating element structure according to any of the above-described embodiments may be applicable to a wearable device. A heating element structure according to any of the above-described embodiments may also be applicable to outdoor activity gear, for example, to a heating device for use in a cold environment.

A heating element structure according to any of the above-described embodiments may be applicable to various fields in which insulating characteristics are beneficial, for example, to a sealant material of an electric heater, tempered glass, a fuel cell, or a solar cell.

One or more embodiments of the present disclosure will now be described in detail with reference to the following examples. However, these examples are only for illustrative purposes and are not intended to limit the scope of the one or more embodiments of the present disclosure.

EXAMPLES

Example 1

Manufacture of Preliminary Heating Element Structure

An oxide glass having a composition represented in Table 2 was used as a matrix material.

TABLE 2

| Components | Amount (wt %) |
| --- | --- |
| BaO (component A) | 34.5 |
| $SiO_2$ (component B) | 19.9 |
| $Al_2O_3$ (component C) | 0.80 |
| $B_2O_3$ (component D) | 14.9 |
| NiO (component E) | 0.20 |
| CoO (component F) | 1.60 |
| Mixture of SrO, $Cr_2O_3$, $Fe_2O_3$, MgO, $TiO_2$, and $ZrO_2$ (component G) | 27.75 |
| Mixture of $Li_2O$, $Na_2O$, and $K_2O$ (component H) | 0.35 |

98 wt % of the oxide glass as a matrix material, having the composition in Table 2, was mixed with 2 wt % of magnesium oxide (MgO), and then with water and hydroxypropylmethyl cellulose (HPMC), to prepare an insulating layer composition. A total amount of the matrix material and the magnesium oxide was about 55 wt %, and a total amount of the HPMC and water was about 45 wt %, each based on a total weight of the insulting layer composition. The amount of the HPMC was about 0.625 wt % based on a total weight of the HPMC and water. The magnesium oxide had a size of about 50 nm. The matrix material had a CTE of about $10\times10^{-6}$ $K^{-1}$ and the magnesium oxide had a CTE of about $11\times10^{-6}$ $K^{-1}$, with a difference in CTE of about $1\times10^{-6}$ $K^{-1}$ between the two materials.

The insulating layer-forming composition was coated on a Fe-based support as a conductive metal substrate and then subjected to a first thermal treatment at about 100° C. to remove the solvent. The resulting product was then thermally treated (second thermal treatment) in a belt furnace to form an insulating layer having a thickness of about 160 μm. The second thermal treatment was performed in a hot zone at a temperature of about 850° C. for about 5 minutes.

A silver paste was screen-printed on the insulating layer formed according to the above processes and then thermally treated (third thermal treatment) in a belt furnace to form silver (Ag) electrodes having a thickness of about 10 μm, thereby manufacturing a preliminary heating element structure. The third thermal treatment was performed in a hot zone at a temperature of about 750° C. for about 5 minutes.

Example 2

Manufacture of Preliminary Heating Element Structure

A preliminary heating element structure was manufactured in the same manner as in Example 1, except that 99 wt % of the matrix material and 1 wt % of magnesium oxide (MgO) were used, instead of 98 wt % of the matrix material and 2 wt % of magnesium oxide (MgO), to prepare the insulating layer-forming composition.

Example 3

Manufacture of Preliminary Heating Element Structure

A preliminary heating element structure was manufactured in the same manner as in Example 1, except that 90 wt % of the matrix material and 10 wt % of magnesium oxide (MgO) were used, instead of 98 wt % of the matrix material and 2 wt % of magnesium oxide (MgO), to prepare the insulating layer-forming composition.

Examples 4-5

Manufacture of Heating Element Structure

A preliminary heating element structure was manufactured in the same manner as in Example 1, except that magnesium having a size of about 1 μm (Example 4) and a size of about 5 μm (Example 5) were used, to prepare the insulating layer-forming composition.

Examples 6-7

Manufacture of Heating Element Structure

A preliminary heating element structure was manufactured in the same manner as in Example 1, except that the thickness of the insulating layer was changed to about 50 μm (Example 6) and about 500 μm (Example 7).

Example 8

Manufacture of Preliminary Heating Element Structure

A preliminary heating element structure was manufactured in the same manner as in Example 1, except that titanium oxide ($TiO_2$) was used, instead of magnesium oxide (MgO), to prepare the insulating layer composition. The matrix material had a CTE of about $10\times10^{-6}$ $K^{-1}$ and the titanium oxide had a CTE of about $9\times10^{-6}$ $K^{-1}$, with a difference in CTE of about $1\times10^{-6}$/K therebetween.

Example 9

Manufacture of Heating Element Structure

The insulating layer composition was coated on a Fe-based support as a conductive metal substrate and then subjected to a first thermal treatment at about 100° C. to remove the solvent. The resulting product was then thermally treated (second thermal treatment) in a belt furnace to form an insulating layer having a thickness of about 160 μm. The second thermal treatment was performed in a hot zone at a temperature of about 850° C. for about 5 minutes.

A silver paste was screen-printed on the insulating layer formed according to the above processes and then thermally treated (third thermal treatment) in a belt furnace to form silver (Ag) electrodes having a thickness of about 10 μm, thereby manufacturing a preliminary heating element structure. The third thermal treatment was performed in a hot zone at a temperature of about 750° C. for about 5 minutes.

A heating element structure was manufactured by spray-coating, onto the silver electrodes, a heating layer composition containing $RuO_2$ and the oxide glass of Example 1, and then thermally treating a resulting structure at about 800° C. for about 5 minutes to form a heating layer having a thickness of about 30 μm or less.

Examples 10-11

Manufacture of Heating Element Structure

Heating element structures were manufactured in the same manner as in Example 9, except that the insulating layer compositions of Examples 2 and 3 were used, respectively, instead of the heating layer composition of Example 1.

Comparative Example 1

Manufacture of Preliminary Heating Element Structure

A preliminary heating element structure was manufactured in the same manner as in Example 1, except that magnesium oxide (MgO) was not used in preparing the insulating layer composition. The matrix material had a CTE of about $10\times10^{-6}$ $K^{-1}$.

Comparative Example 2

Manufacture of Preliminary Heating Element Structure

A preliminary heating element structure was manufactured in the same manner as in Example 1, except that silicon oxide ($SiO_2$) (having a size of about 1 μm) was used, instead of oxide (MgO), to prepare the insulating layer-forming composition. The matrix material had a CTE of about $10 \times 10^{-6}$ $K^{-1}$ and the silicon oxide had a CTE of about $2 \times 10^{-6}$ $K^{-1}$, with a difference in CTE of about $8 \times 10^{-6}$ $K^{-1}$ therebetween.

Comparative Example 3

Manufacture of Heating Element Structure

Heating element structures were manufactured in the same manner as in Example 9, except that the insulating layer composition of Comparative Example 1 was used, instead of the heating layer composition of Example 1.

Evaluation Example 1

Measurement of Coefficient of Thermal Expansion (CTE) of Insulating Layer

The coefficient of thermal expansion (CTEs) for each of the insulating layers of Example 1, Comparative Example 1, and Comparative Example 2, and the matrix material and the particles used to form each of the insulating layers, were analyzed using a thermo-mechanical analyzer (TMA 402 F1, NETZSCH, Germany) in a nitrogen atmosphere under the following conditions: $1^{st}$ step—increasing the temperature to about 150° C. at a heating rate of about 10° C./min to move water from the insulating layer; $2^{nd}$ step—cooling down to room temperature at a cooling rate of about 5° C./min; and $3^{rd}$ step—measuring an expansion ratio of each sample while further heating from room temperature to about 500° C. at a heating rate of about 10° C./min. After measuring the CTE of the matrix materials and the particles used in each of the insulating layers in this way, a difference in CTE between the matrix material and the particle used in each of the insulating layers was calculated. The results are shown in Table 3.

In Table 3, the CTE of each insulating layer was calculated, for example, when the amount of the particle in an insulating layer is about 2wt %, using the following equation:

Insulating layer CTE=[(CTE of the matrix material)× 0.98]+[(CTE of the particle)×0.02].

TABLE 3

| Example | CTE of matrix material ($\times 10^{-6}$ $K^{-1}$) | CTE of particle ($\times 10^{-6}$ /K) | Difference in CTE between matrix material and particle ($\times 10^{-6}$ $K^{-1}$) | Calculated CTE of insulating layer ($\times 10^{-6}$ $K^{-1}$) |
|---|---|---|---|---|
| Example 1 | 10 | 11 | 1 | 10.02 |
| Comparative Example 1 | 10 | — | — | 10 |
| Comparative Example 2 | 10 | 2 | 8 | 9.84 |

Referring to Table 3, the preliminary heating element structure of Example 1 was found to have a difference in CTE of about 1 ×$10^{-6}$ $K^{-1}$ between the matrix material and the particle, and the preliminary heating element structure of Comparative Example 2 was found to have a difference in CTE of about $8 \times 10^{-6}$ $K^{-1}$ between the matrix material and the particle.

Evaluation Example 2

Insulating Characteristics of Heating Element Structure Example 1 and Comparative Examples 1-2

Figure 3:
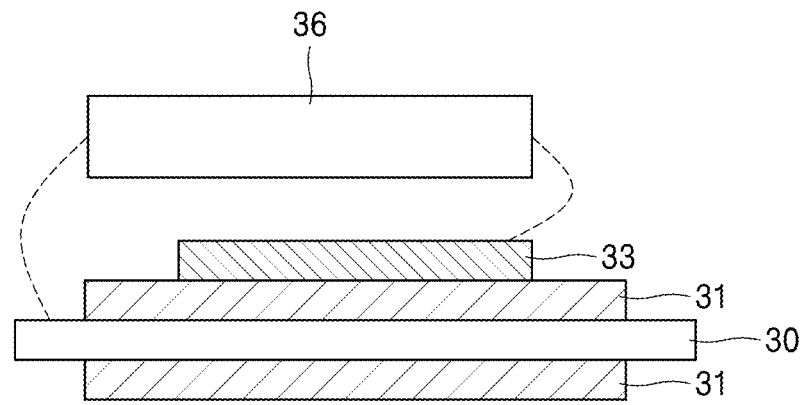
FIG. 3 illustrates an insulation tester used to evaluate the insulating characteristics of a preliminary heating element structure manufactured according to embodiments.

Insulating characteristics of the insulating layers in the preliminary heating element structures of Example 1, Comparative Example 1, and Comparative Example 2 were analyzed using a HIOKI 3153 Insulation tester 36 illustrated in FIG. 3.

Figure 4:
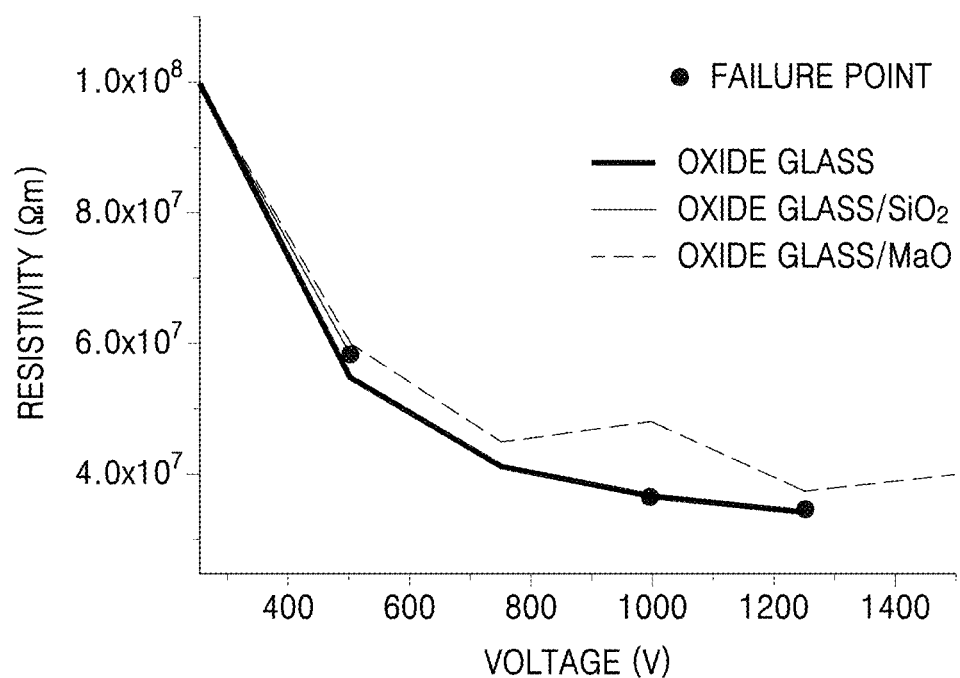
FIG. 4 is a graph of resistivity (ohm-meter, Ωm) versus voltage (volts, V) for the heating element structures of Example 1, Comparative Example 1, and Comparative Example 2.

After connecting two terminals of the HIOKI 3153 Insulation tester 36 to the Ag electrodes 33 on the insulating layer 31 and the Fe-based support 30, respectively, a leakage current between the Ag electrode and the Fe-based support was measured while increasing a voltage at room temperature. The analysis results are shown in FIG. 4. In FIG. 4, "oxide glass", "oxide glass/$SiO_2$", and "oxide glass/MgO" indicate Comparative Example 1, Comparative Example 2, and Example 1, respectively. The "failure point" in FIG. 4, is the point at which the test sample failed to operate. The dielectric strength and maximum voltage of each of the insulating layers of Example 1 and Comparative Examples 1 and 2 are represented in Table 4.

The dielectric strength value of each insulating layer was obtained by measuring a leakage current at room temperature in the atmosphere while increasing a voltage from about 250 V to about 1,500 V, and then dividing a voltage at a leakage current of about 100 milliampere (mA) or greater by the thickness of the insulating layer. The maximum voltage of each insulating layer was a voltage at a leakage current of about 100 mA.

TABLE 4

| Example | Dielectric strength (kV/mm) | Maximum voltage (V) |
|---|---|---|
| Example 1 | 9.38 | Greater than 1,500 |
| Comparative Example 1 | 7.81 | 1,250 |
| Comparative Example 2 | 3.13 | 500 |

Referring to Tables 3 and 4, the preliminary heating element structure of Example 1 was found to have improved insulating characteristics (higher by about 20%), compared to the preliminary heating element structure of Comparative Example 1. In particular, the preliminary heating element structure of Example 1 was found to have a low leakage current at about 500 V, 750 V, and 1,000 V, and to have a low leakage current of about 10 mm or less, even at about 1,500 V or greater, between the two electrodes.

The preliminary heating element structure of Comparative Example 2 manufactured using $SiO_2$ particles in the insulating layer was found to exhibit insulating characteristics at a maximum voltage of about 500 V, indicating poor insulating characteristics compared to the preliminary heating element structure of Comparative Example 1. Without being limited by theory, the poor insulating characteristics of Comparative Example 2 are attributed to a difference in CTE between the matrix material (oxide glass) and the particle of about $4 \times 10^{-6}$ $K^{-1}$ or greater, which may result in a stress between the particle and the matrix material, causing a defect such as a micro-crack. The presence of such microcracks may serve as an electrical flow path, thereby lowering insulating characteristics.

2) Examples 2 and 3

Insulating characteristics of the preliminary heating element structures of Examples 2 and 3 were evaluated in the same manner as applied to the preliminary heating element structures of Example 1 and Comparative Examples 1 and 2.

As a result of the evaluation, the preliminary heating element structures of Examples 2 and 3 were found to represent nearly the same insulating characteristics as the preliminary heating element structure of Example 1.

As described above, according to the one or more embodiments, a heating element structure having an insulating layer including a matrix material and a particle as described above may have improved insulating characteristics due to a suppressed leakage current and a reduced internal stress in the insulating layer. A heating device having an improved heating rate may be manufactured using the heating element structure.

It should be understood that embodiments described herein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A heating element structure comprising:
a conductive metal substrate;
a heating layer spaced apart from the conductive metal substrate and configured to generate heat in response to an electrical signal;
electrodes in contact with the heating layer and configured to provide the electrical signal to the heating layer; and
a first insulating layer on the conductive metal substrate, the first insulating layer comprising a first matrix material and a particle,
wherein a difference between a coefficient of thermal expansion of the first matrix material and a coefficient of thermal expansion of the particle is about $4 \times 10^{-6}$ per Kelvin or less.

2. The heating element structure of claim 1, wherein the first matrix material has a coefficient of thermal expansion of about $8 \times 10^{-6}$ per Kelvin to about $12 \times 10^{-6}$ per Kelvin.

3. The heating element structure of claim 1, wherein the particle has a coefficient of thermal expansion of about $7 \times 10^{-6}$ per Kelvin to about $13 \times 10^{-6}$ per Kelvin.

4. The heating element structure of claim 3, wherein the coefficient of thermal expansion of the particle is greater than the coefficient of thermal expansion of the matrix material.

5. The heating element structure of claim 1, wherein the difference between the coefficient of thermal expansion of the first matrix material and the coefficient of thermal expansion of the particle is about $1 \times 10^{-6}$/K or less.

6. The heating element structure of claim 1, wherein the particle comprises at least one of an oxide, a boride, a nitride, a carbide, or a chalcogenide.

7. The heating element structure of claim 1, wherein the particle comprises at least one of $Al_2O_3$, $Al_2SiO_5$, BeO, BN, $Mg_2Al_4Si_5O_{18}$, $Mg_2SiO_4$, $TiO_2$, $BaTiO_3$, $ZrO_2$, $SiO_2$, or MgO.

8. The heating element structure of claim 1, wherein the particle comprises at least one of MgO, $Mg_2SiO_4$, or $TiO_2$.

9. The heating element structure of claim 1, wherein an amount of the particle is about 1 weight percent to about 10 weight percent based on a total weight of the matrix material and the particle.

10. The heating element structure of claim 1, wherein the particle has a size of about 1 nanometer to about 10 micrometers.

11. The heating element structure of claim 1, wherein the first matrix material comprises at least one of a non-oxide glass, an oxide glass, a ceramic-glass composite, and a polymer.

12. The heating element structure of claim 1, wherein the first matrix material comprises at least one of $SiO_2$, BaO, $B_2O_3$, $Al_2O_3$, MgO, $ZrO_2$, CuO, NiO, CoO, MnO, $TiO_2$, $K_2O$, $Na_2O$, $Li_2O$, $P_2O_4$, ZnO, $Y_2O_3$, $K_2O$, CaO, SrO, $Cr_2O_3$, or $Fe_2O_3$.

13. The heating element structure of claim 1, wherein the first matrix material comprises an oxide glass comprising at least one of BaO, $SiO_2$, $Al_2O_3$, $B_2O_3$, NiO, CoO, SrO, $Cr_2O_3$, $Fe_2O_3$, MgO, $TiO_2$, $ZrO_2$, $Li_2O$, $Na_2O$, or $K_2O$.

14. The heating element structure of claim 1, wherein the first matrix material comprises BaO, $SiO_2$, $Al_2O_3$, $B_2O_3$, NiO, CoO, a mixture of SrO, $Cr_2O_3$, $Fe_2O_3$, MgO, $TiO_2$, and $ZrO_2$, and a mixture of $Li_2O$, $Na_2O$, and $K_2O$,
wherein,
a weight ratio of BaO to $SiO_2$ is about 1:1 to about 5:1,
an amount of NiO is about 0.1 weight percent to about 30.0 percent,
an amount of CoO is about 0.1 weight percent to about 30.0 percent
an amount of the mixture of SrO, $Cr_2O_3$, $Fe_2O_3$, MgO, $TiO_2$, and $ZrO_2$ is about 0.1 weight percent to about 30.0 percent and
an amount of the mixture of $Li_2O$, $Na_2O$, and $K_2O$ is about 0.1 weight percent to about 2.2 weight percent,
wherein all weight percents are based on a total weight of the oxide glass.

15. The heating element structure of claim 1, wherein the first matrix material comprises an oxide glass comprising BaO, $SiO_2$, $Al_2O_3$, $B_2O_3$, NiO, CoO, a mixture of SrO, $Cr_2O_3$, $Fe_2O_3$, MgO, $TiO_2$, and $ZrO_2$, and a mixture of $Li_2O$, $Na_2O$, and $K_2O$, and
the particle of the insulating layer comprises at least one of MgO, $Mg_2SiO_4$, or $TiO_2$).

16. The heating element structure of claim 1, wherein the matrix material of the insulating layer includes an oxide glass comprising at least one component selected from BaO (component A), $SiO_2$ (component B), $Al_2O_3$ (component C), $B_2O_3$ (component D), NiO (component E), CoO (component F), SrO, $Cr_2O_3$, $Fe_2O_3$, MgO, $TiO_2$, and $ZrO_2$ (Component G), at least one component (component H) selected from $Li_2O$, $Na_2O$, and $K_2O$, and at least one component (component I) selected from CaO, $TiO_2$, ZnO, and $ZrO_2$,
a weight ratio of component A/component B is about 1 to about 5,
a content of component E is about 0.1 wt % to about 30.0 wt % based on a total weight of the oxide glass,
a content of component F is about 0.1 wt % to about 30.0 wt %,
a content of component G is about 0.1 wt % to about 30.0 wt %,
a content of component H is about 0.1 wt % to about 2.2 wt %, and
a content of component I is about 0.1 wt % to about 5.0 wt %.

17. The heating element structure of claim 1, wherein the particle has a dielectric strength of about 5 kilovolts per millimeter or greater.

18. The heating element structure of claim 1, wherein the first insulating layer comprising the first matrix material and the particle has a dielectric strength which is at least about 10% or greater than a dielectric strength of an insulating layer comprising only the matrix material.

19. The heating element structure of claim 1, wherein the heating layer comprises a second matrix material and a filler.

20. The heating element structure of claim 19, wherein the second matrix material comprises at least one of a silicon oxide, a lithium oxide, a nickel oxide, a cobalt oxide, a boron oxide, a potassium oxide, an aluminum oxide, a titanium oxide, a manganese oxide, a copper oxide, a zirconium oxide, a phosphorus oxide, a zinc oxide, a bismuth oxide, a lead oxide, or a sodium oxide;
wherein the silicon oxide comprises at least one of lithium (Li), nickel (Ni), cobalt (Co), boron (B), potassium (K), aluminum (Al), titanium (Ti), manganese (Mn), copper (Cu), zirconium (Zr), phosphorous (P), zinc (Zn), bismuth (Bi), lead (Pb), or sodium (Na).

21. The heating element structure of claim 20, wherein the second matrix material comprises at least one of a polyimide, a polyphenylene sulfide, a polybutylene terephthalate, a polyamide-imide, a liquid crystalline polymer, polybutylene terephthalate polyethylene terephthalate, or a polyetheretherketone (PEEK).

22. The heating element structure of claim 20, wherein the filler comprises at least of an oxide, a boride, a carbide, or a chalcogenide.

23. The heating element structure of claim 1, wherein the electrodes are disposed between the heating layer and the conductive metal substrate, or the heating layer is disposed between the electrodes and the conductive metal substrate.

24. The heating element structure of claim 1, wherein the heating element structure further comprises a second insulating layer in contact with the conductive metal substrate.

25. The heating element structure of claim 1, wherein the first insulating layer has a thickness of about 50 micrometers to about 500 micrometers.

26. A heating device comprising the heating element structure of claim 1.

27. The heating device of claim 25, wherein the heating element structure is a planar heating element structure having a 2-dimensional area.

28. A method of forming the heating element structure of claim 1, the method comprising:
providing an insulating layer composition comprising a matrix material and a particle;
applying the insulating layer composition on a surface of the conductive metal substrate;
thermally treating the insulating layer composition on the surface of the conductive metal substrate to form the insulating layer; and
disposing the electrodes and the heating layer on the insulating layer.

29. The method of claim 27, wherein the thermal treatment is performed at a temperature of about 600° C. to about 1000° C.

* * * * *